(12) United States Patent
Lin et al.

(10) Patent No.: US 7,530,492 B2
(45) Date of Patent: May 12, 2009

(54) CARD DISCRIMINATING SYSTEM AND METHOD OF THE SAME

(75) Inventors: Wei-Jung Lin, TaiPei (TW); Chih-Hsu Tsai, TaiPei (TW); Chih-Ching Liao, TaiPei (TW)

(73) Assignee: International Currency Technologies Corporation, Taipei (TW)

( * ) Notice: Subject to any disclaimer, the term of this patent is extended or adjusted under 35 U.S.C. 154(b) by 477 days.

(21) Appl. No.: 11/500,875

(22) Filed: Aug. 9, 2006

(65) Prior Publication Data

US 2007/0246535 A1    Oct. 25, 2007

(30) Foreign Application Priority Data

Apr. 21, 2006    (TW) .............................. 95114213 A (51) Int. Cl.
*G06K 5/00*    (2006.01)
*G06K 7/00*    (2006.01)
*G06K 7/08*    (2006.01)
*G06K 19/06*    (2006.01)

(52) U.S. Cl. ...................... 235/380; 235/382; 235/440; 235/446; 235/451; 235/449; 235/492; 235/493

(58) Field of Classification Search ................ 235/380, 235/382, 440, 446, 451, 449, 492, 493
See application file for complete search history.

(56) References Cited

U.S. PATENT DOCUMENTS

| | | | | |
|---|---|---|---|---|
| 4,785,290 A | * | 11/1988 | Goldman | 340/5.86 |
| 4,926,031 A | * | 5/1990 | Stenzel | 235/380 |
| 5,546,462 A | * | 8/1996 | Indeck et al. | 713/176 |
| 5,594,229 A | * | 1/1997 | Hoshino et al. | 235/449 |
| 5,986,550 A | * | 11/1999 | Rapaport et al. | 340/572.3 |

\* cited by examiner

*Primary Examiner*—Thien M. Le
*Assistant Examiner*—Tuyen K Vo
(74) *Attorney, Agent, or Firm*—Birch, Stewart, Kolasch & Birch, LLP (57) ABSTRACT

The invention discloses a card discriminating system used for identifying whether a card is authentic or not. The card has a surface, and N sensing marks are formed on the surface of the card. The card discriminating system includes a position-based pulse generation module, at least one sensor, and a micro-controller unit. The micro-controller unit is respectively coupled with the position-based pulse generating module and each of the sensors. When the card actuates and passes through the position-based pulse generating module, the position-based pulse generating module will generate a reference position-based pulse. When one of the N sensing marks of the card passes through one of the sensors, the sensor will generate a corresponding sensing position-based pulse. The micro-controller unit is used for comparing the sensing position-based pulse with the reference position-based pulse, so as to identify whether the card is authentic or not.

7 Claims, 6 Drawing Sheets

CARD DISCRIMINATING SYSTEM AND METHOD OF THE SAME

BACKGROUND OF THE INVENTION

1. Field of the Invention

The invention relates to a card discriminating system and a method thereof and, more particularly, to a card discriminating system and a method thereof capable of identifying whether a card is authentic or not based on the position of a sensing mark on the card.

2. Description of the Prior Art

As the number of license cards increases, people use also license cards in their daily lives more and more. In general, there are always some marks formed on the license card for the purpose of identification. People usually check the marks on the license card with human eye immediately to identify whether the license card is authentic or not. It is inconvenient, and there is always the probability of making a mistake. Therefore, if the identification of the license card can be automatically performed by an electronic device, the license card may be applied to more fields.

Currently, though there are some devices capable of automatically identifying a license card (e.g. IC card), the license card has to be inserted into the device in a specific direction. In other words, when the user inserts the license card into the device in a wrong direction, s/he has to wait until the license card is ejected and then reinserts the license card in the right direction, so it is very inconvenient for the user.

Therefore, the scope of the present invention is to provide a card discriminating system and a method thereof to solve the aforesaid problem.

SUMMARY OF THE INVENTION

A scope of the invention is to provide a card discriminating system and a method thereof, wherein the card discriminating system utilizes at least one sensor to sense at least one position-based pulse of one of the sensing marks on a card, so as to identify whether the card is authentic or not accordingly.

Another scope of the invention is to provide a card discriminating system and a method thereof, wherein according to the position of each sensing mark on the obverse side or the reverse side of a card, the card discriminating system employs a plurality of sensors, each of which corresponds to one of the sensing marks on the card. Accordingly, no matter the card is inserted in which direction, the card discriminating system can always sense at least one position-based pulse of the sensing marks, so as to identify whether the card is authentic or not.

According to a preferred embodiment, the card discriminating system of the invention is used for identifying whether a card is authentic or not. The card has a surface, and N sensing marks are formed on the surface of the card, wherein the surface may be an obverse side or a reverse side of the card. In this embodiment, the card discriminating system comprises a position-based pulse generating module, a sensor, and a micro-controller unit. The micro-controller unit is respectively coupled with the position-based pulse generating module and the sensor.

In the aforesaid embodiment, the position-based pulse generating module will generate a reference position-based pulse while the card actuates and passes through the position-based pulse generating module, wherein the reference position-based pulse comprises N absolute position-based pulses, each of which corresponds to one of the N sensing marks respectively. The sensor will generate a corresponding sensing position-based pulse while one of the N sensing marks on the surface (i.e. obverse side or reverse side) of the card passes through the sensor. The micro-controller unit is used for receiving the reference position-based pulse and the sensing position-based pulse and for comparing the sensing position-based pulse with each of the N absolute position-based pulses, wherein when the sensing position-based pulse is the same as one of the N absolute position-based pulses, the micro-controller unit identifies the card as authentic; in other words, when the sensing position-based pulse is different from each of the N absolute position-based pulses, the micro-controller unit identifies the card as fake.

In the aforesaid embodiment, since there may be a plurality of sensing marks formed on different positions of each side (i.e. obverse side or reverse side) of the card, the card discriminating system may further employ a plurality of sensors, each of which corresponds to one of the sensing marks on the card. Accordingly, no matter the card is inserted in which direction, the card discriminating system can always sense at least one position-based pulse of the sensing marks, so as to identify whether the card is authentic or not.

Therefore, the card discriminating system of the invention utilizes at least one sensor to sense the position-based pulse of the corresponding sensing mark on the card. Furthermore, according to the number of the sensing marks on the card and the position of each sensing mark, the invention may employ a plurality of sensors, each of which corresponds to one of the sensing marks on the card. Accordingly, no matter the card is inserted in which direction, the card discriminating system can always sense at least one position-based pulse of the sensing marks, so as to identify whether the card is authentic or not.

The advantage and spirit of the invention may be understood by the following recitations together with the appended drawings.

DETAILED DESCRIPTION OF THE INVENTION

Figure 1A:
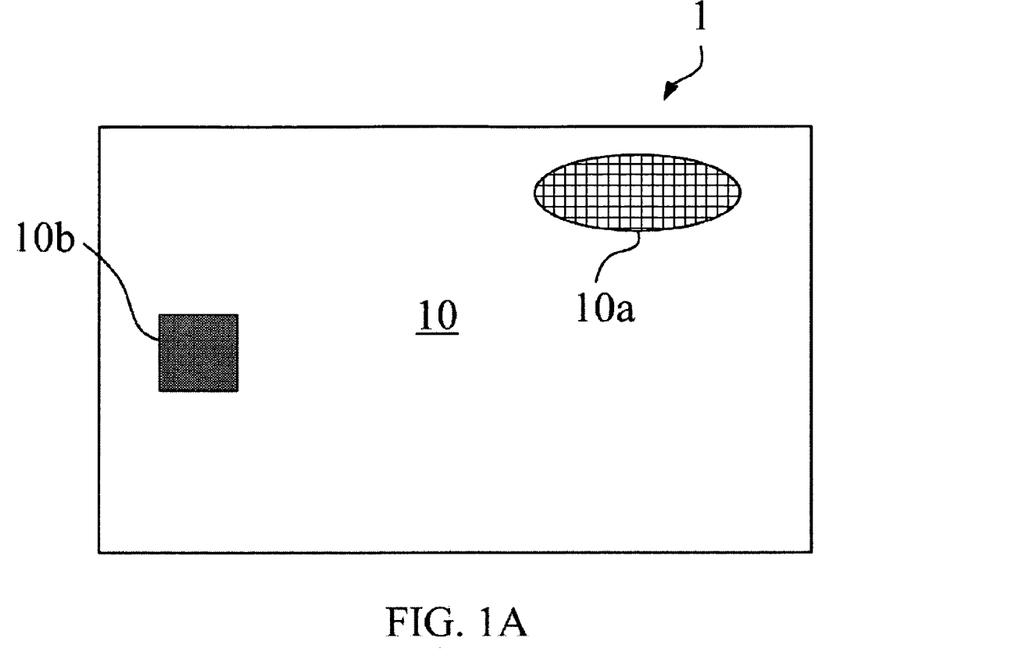
FIG. 1A is a schematic diagram illustrating the obverse side of the card.
Figure 1B:
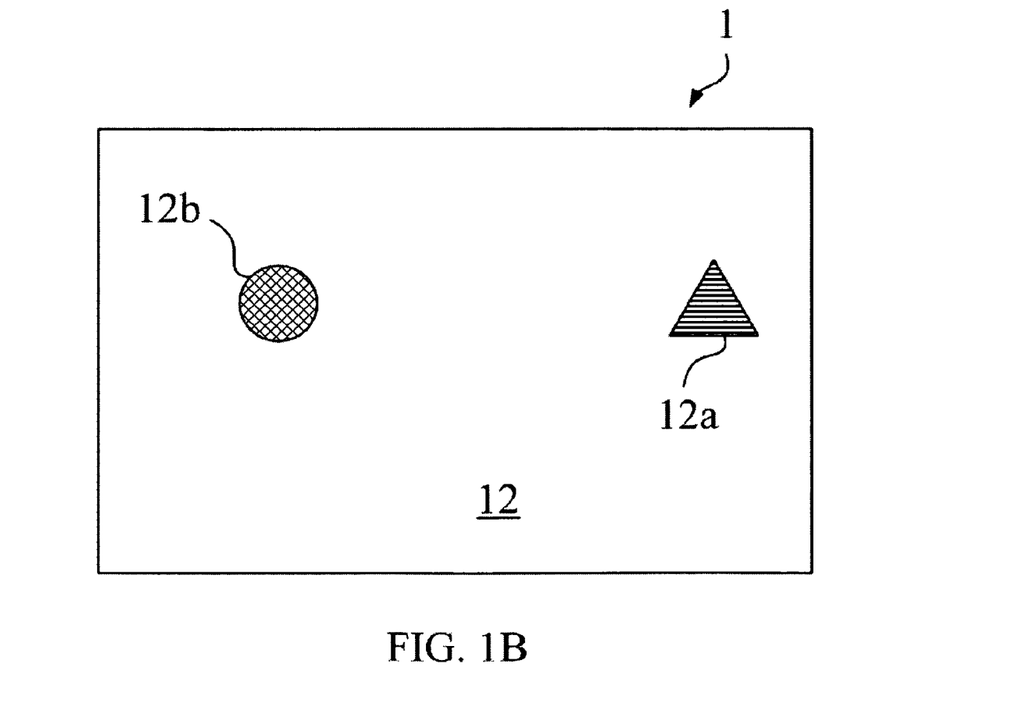
FIG. 1B is a schematic diagram illustrating the reverse side of the card.

Referring to FIGS. 1A and 1B, FIG. 1A is a schematic diagram illustrating the obverse side 10 of the card 1. FIG. 1B is a schematic diagram illustrating the reverse side 12 of the card 1. The card discriminating system of the invention is used for identifying whether a card is authentic or not. The card has a surface, and N sensing marks are formed on the surface of the card. As shown in FIGS. 1A and 1B, the card 1 has an obverse side 10 and a reverse side 12, wherein two sensing marks 10a and 10b are formed on the obverse side 10, and two sensing marks 12a and 12b are formed on the reverse side 12. The card 1 may be an identification card (ID card), a driver's license or the like. The following is a description of embodiments of the invention as applied to the card discriminating system. It is not intended to limit the scope of the invention.

First Preferred Embodiment

Figure 2:
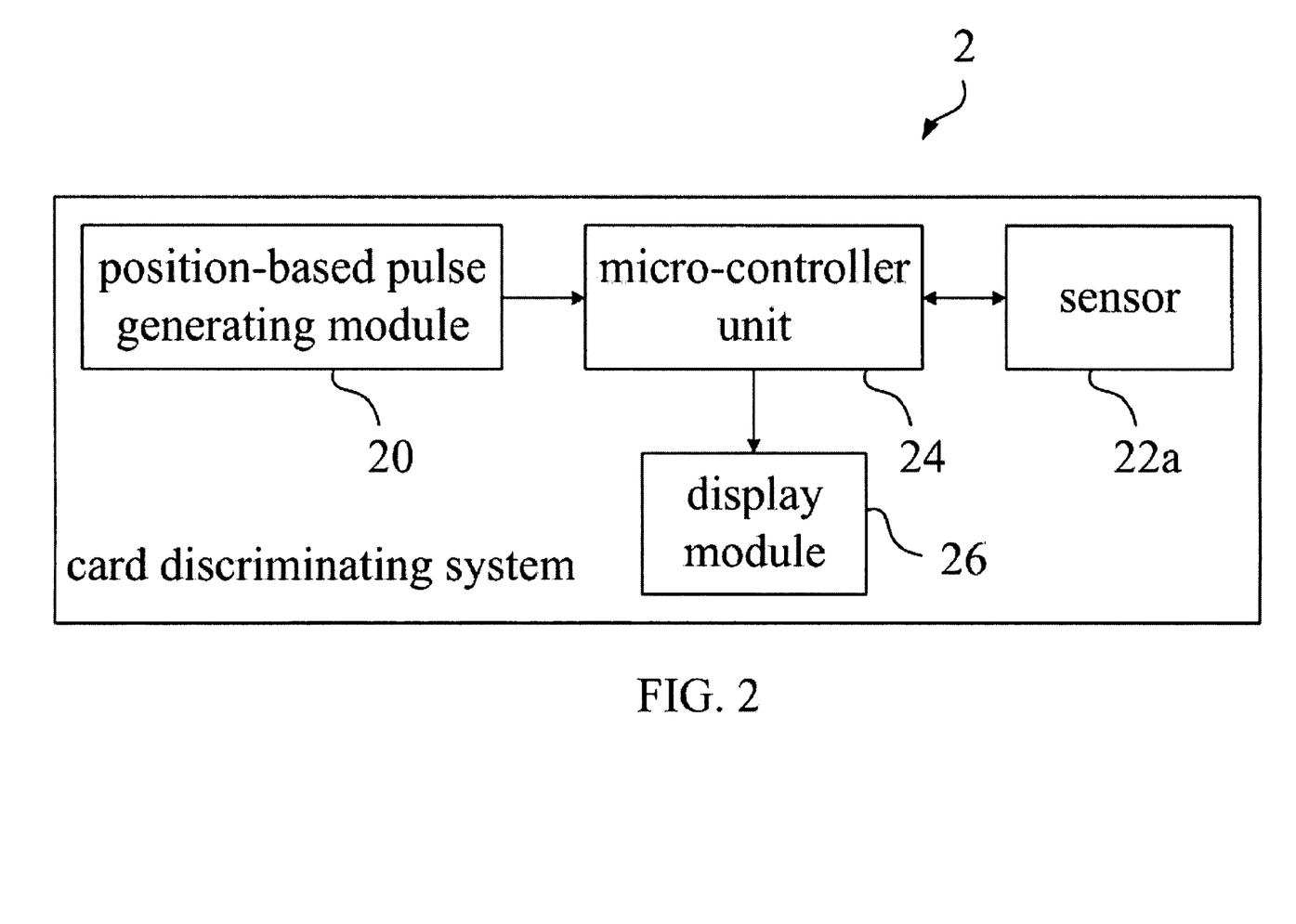
FIG. 2 is a functional block diagram illustrating the card discriminating system according to a first preferred embodiment of the invention.

Referring to FIG. 2, FIG. 2 is a functional block diagram illustrating the card discriminating system 2 according to a first preferred embodiment of the invention. As shown in FIG. 2, the card discriminating system 2 comprises a position-based pulse generating module 20, a sensor 22a, and a micro-controller unit 24. The micro-controller unit 24 is respectively coupled with the position-based pulse generating module 20 and the sensor 22a. In this embodiment, the card discriminating system 2 is installed in a housing (not shown), and the sensor 22a is configured to sense the sensing mark 10a on the obverse side 10 of the card 1.

Figure 3:
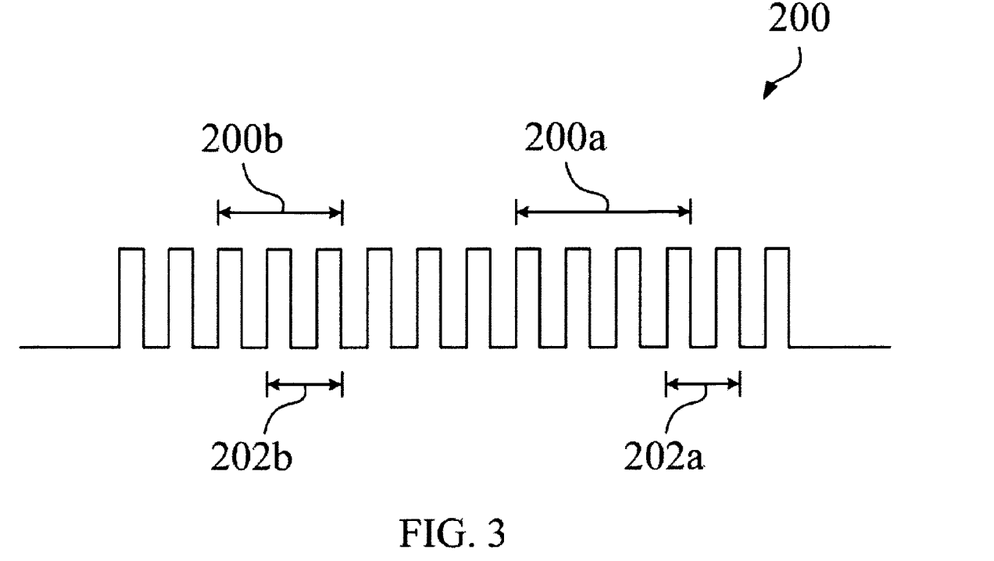
FIG. 3 is a schematic diagram illustrating the reference position-based pulse.

Referring to FIG. 3, FIG. 3 is a schematic diagram illustrating the reference position-based pulse 200. In the aforesaid first embodiment, when the user inserts the card 1 into a housing (not shown) equipped with the card discriminating system 2, the card 1 will actuate and will pass through the position-based pulse generating module 20, such that the position-based pulse generating module 20 will generate a reference position-based pulse 200. The reference position-based pulse 200 comprises N absolute position-based pulses, each of which corresponds to one of the N sensing marks. As shown in FIG. 3, the reference position-based pulse 200 comprises four absolute position-based pulses 200a, 200b, 202a and 202b, each of which corresponds to one of the four sensing marks 10a, 10b, 12a and 12b.

Figure 4:
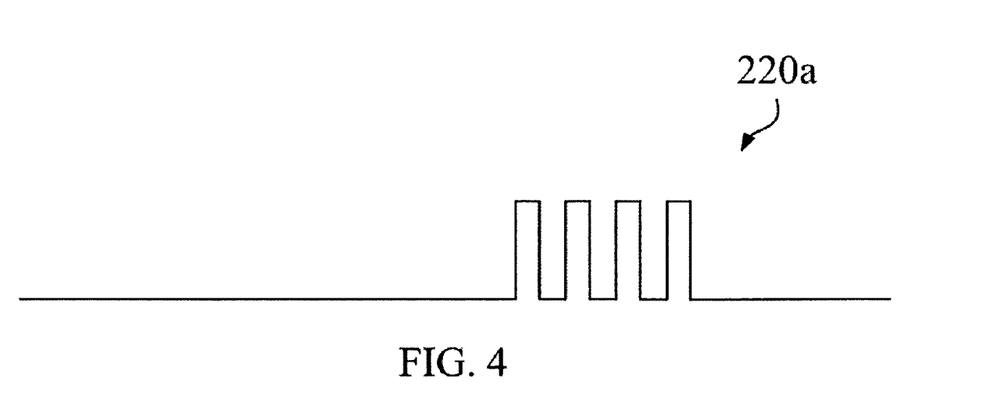
FIG. 4 is a schematic diagram illustrating the sensing position-based pulse.

Referring to FIG. 4, FIG. 4 is a schematic diagram illustrating the sensing position-based pulse 220a. When the sensing mark 10a on the obverse side 10 of the card 1 passes through the sensor 22a, the sensor 22a will generate a sensing position-based pulse 220a, as shown in FIG. 4. Afterwards, the micro-controller unit 24 receives the reference position-based pulse 200 and the sensing position-based pulse 220a and then compares the sensing position-based pulse 220a with each of the absolute position-based pulses 200a, 200b, 202a and 202b. When the sensing position-based pulse 220a is the same as one of the absolute position-based pulses 200a, 200b, 202a and 202b, the micro-controller unit 24 will identify the card 1 as authentic; alternatively, when the sensing position-based pulse 220a is different from each of the absolute position-based pulses 200a, 200b, 202a and 202b, the micro-controller unit 24 will identify the card 1 as fake. In this embodiment, the sensing position-based pulse 220a generated by the sensor 22a and associated with the sensing mark 10a is the same as the absolute position-based pulse 200a of the reference position-based pulse 200, so the micro-controller unit 24 identifies the card 1 as authentic.

It should be noted that the sensor 22a can be also configured to sense the sensing mark 10b on the obverse side 10 or the sensing marks 12a, 12b on the reverse side 12, so as to achieve the aforesaid identification of the card 1, depending on the practical application of the design.

In the aforesaid first embodiment, the card discriminating system 2 may further comprise a display module 26 for displaying the information regarding whether the card is authentic or not. The card discriminating system 2 may further comprise a power supply (not shown) for providing power for the position-based pulse generating module 20, the sensor 22a, the micro-controller unit 24, and the display module 26.

Second Preferred Embodiment

Figure 5:
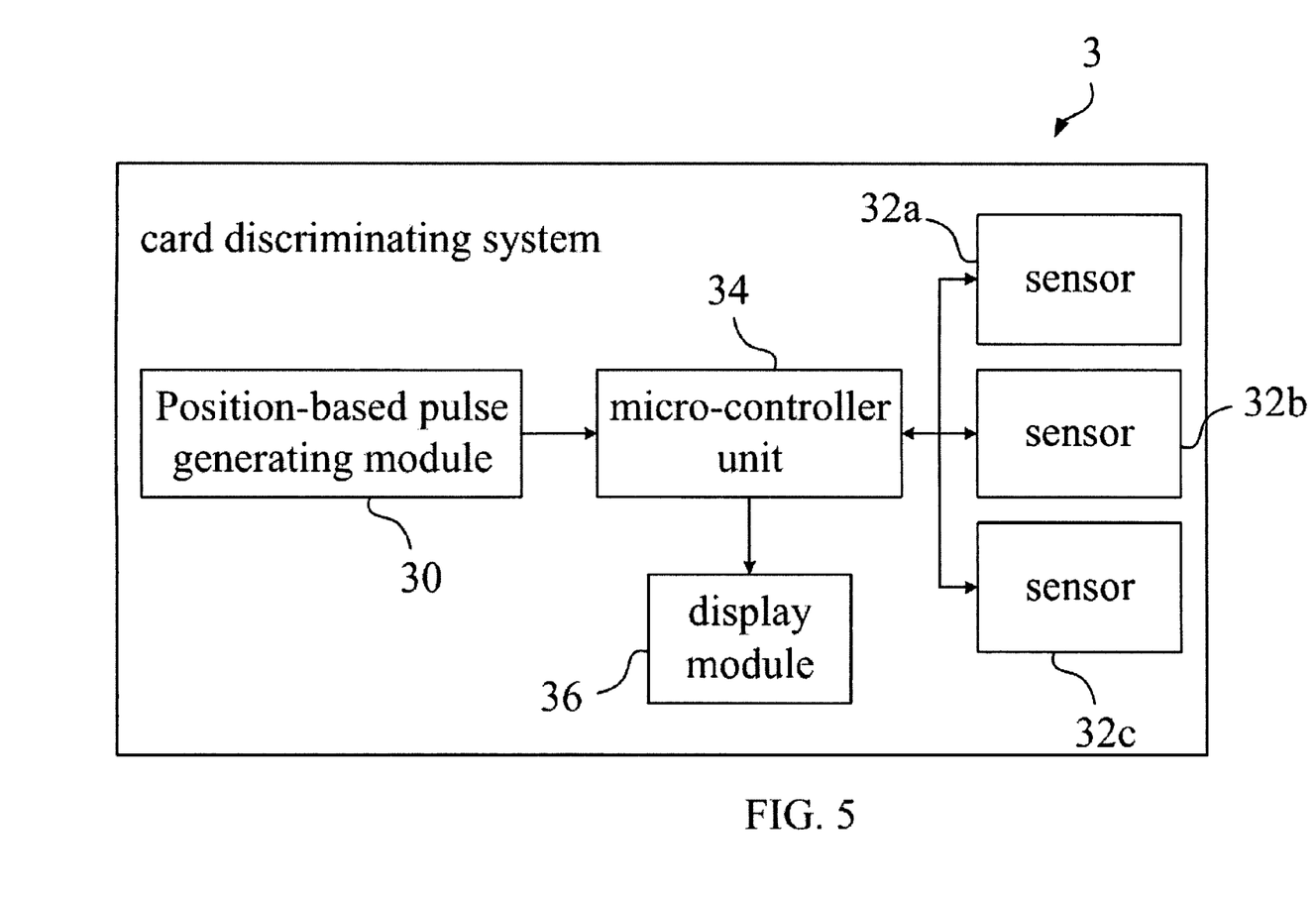
FIG. 5 is a functional block diagram illustrating the card discriminating system according to a second preferred embodiment of the invention.

Referring to FIGS. 1A, 1B and 5, FIG. 5 is a functional block diagram illustrating the card discriminating system 3 according to a second preferred embodiment of the invention. As shown in FIG. 5, the card discriminating system 3 comprises a position-based pulse generating module 30, three sensors 32a, 32b, 32c, and a micro-controller unit 34. The micro-controller unit 34 is respectively coupled with the position-based pulse generating module 30 and the sensors 32a, 32b and 32c. In this embodiment, the card discriminating system 3 is installed in a housing (not shown). The sensor 32a is configured to sense the sensing mark 10a on the obverse side 10 of the card 1; the sensor 32b is configured to sense the sensing mark 10b on the obverse side 10 of the card 1, and the sensor 32c is configured to sense the sensing marks 12a, 12b on the reverse side 12 of the card 1.

Figure 6:
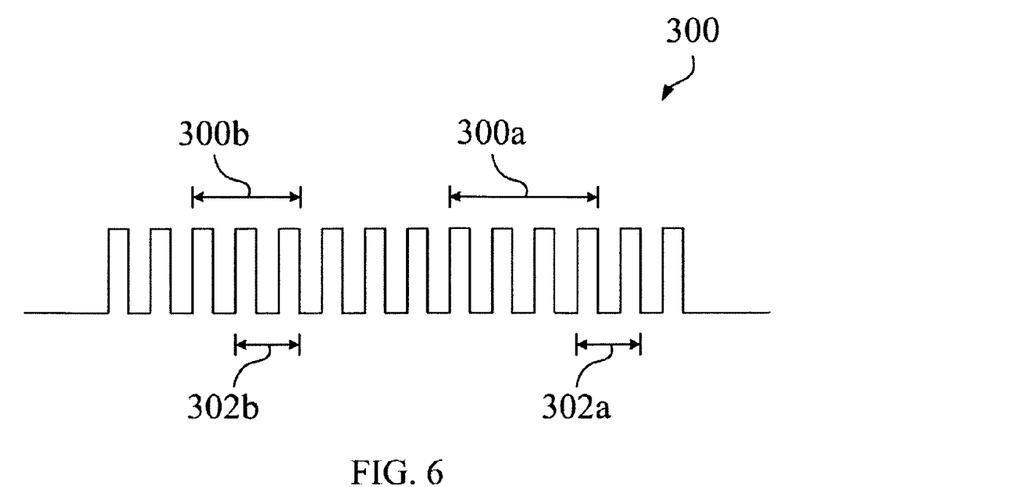
FIG. 6 is a schematic diagram illustrating the reference position-based pulse.

Referring to FIG. 6, FIG. 6 is a schematic diagram illustrating the reference position-based pulse 300. In the aforesaid second embodiment, when the user inserts the card 1 into a housing (not shown) equipped with the card discriminating system 3, the card 1 will actuate and will pass through the position-based pulse generating module 30, such that the position-based pulse generating module 30 will generate a reference position-based pulse 300. The reference position-based pulse 300 comprises N absolute position-based pulses, each of which corresponds to one of the N sensing marks. As shown in FIG. 6, the reference position-based pulse 300 comprises four absolute position-based pulses 300a, 300b, 302a, and 302b, each of which corresponds to one of the four sensing marks 10a, 10b, 12a, and 12b.

Figure 7A:
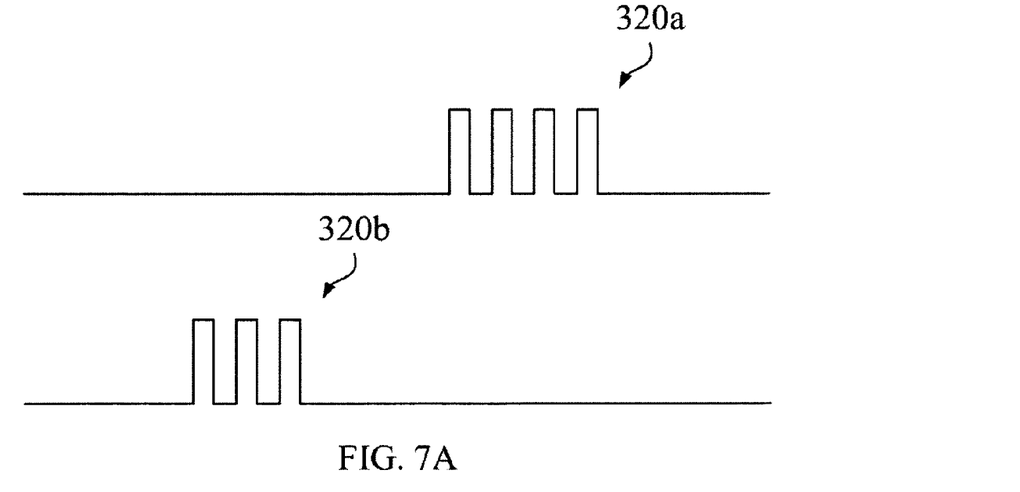
FIG. 7A is a schematic diagram illustrating the sensing position-based pulses.

Referring to FIG. 7A, FIG. 7A is a schematic diagram illustrating the sensing position-based pulses 320a and 320b. When the sensing mark 10a on the obverse side 10 of the card 1 passes through the sensor 32a, the sensor 32a will generate a corresponding sensing position-based pulse 320a, and when the sensing mark 10b on the obverse side 10 of the card 1 passes through the sensor 32b, the sensor 32b will generate a corresponding sensing position-based pulse 320b, as shown in FIG. 7A. Afterwards, the micro-controller unit 34 receives the reference position-based pulse 300 and the sensing position-based pulses 320a, 320b and then compares the sensing position-based pulses 320a, 320b with each of the absolute position-based pulses 300a, 300b, 302a, and 302b. When the sensing position-based pulses 320a, 320b are respectively the same as one of the absolute position-based pulses 300a, 300b, 302a, and 302b, the micro-controller unit 34 will identify the card 1 as authentic; alternatively, when one of the sensing position-based pulses 320a, 320b is different from each of the absolute position-based pulses 300a, 300b, 302a and 302b, the micro-controller unit 34 will identify the card 1 as fake. In this embodiment, the sensing position-based pulse 320a generated by the sensor 32a and associated with the sensing mark 10a is the same as the absolute position-based pulse 300a of the reference position-based pulse 300, and the sensing position-based pulse 320b generated by the sensor 32b and associated with the sensing mark 10b is the same as the absolute position-based pulse 300b of the reference position-based pulse 300, so the micro-controller unit 34 identifies the card 1 as authentic.

Figure 7B:
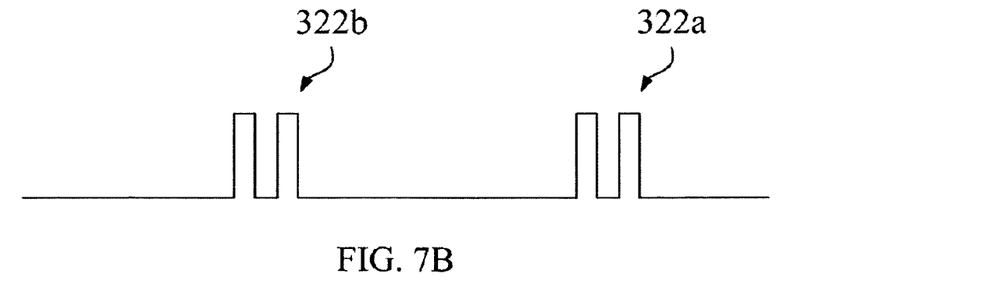
FIG. 7B is a schematic diagram illustrating the sensing position-based pulses.

Referring to FIG. 7B, FIG. 7B is a schematic diagram illustrating the sensing position-based pulses 322a and 322b. On the other hand, when the sensing mark 12a on the reverse side 12 of the card 1 passes through the sensor 32c, the sensor 32c will generate a corresponding sensing position-based pulse 322a, and when the sensing mark 12b on the reverse side 12 of the card 1 passes through the sensor 32c, the sensor 32c will generate a corresponding sensing position-based pulse 322b, as shown in FIG. 7B. Afterwards, the micro-controller unit 34 receives the reference position-based pulse 300 and the sensing position-based pulses 322a, 322b and then compares the sensing position-based pulses 322a, 322b with each of the absolute position-based pulses 300a, 300b, 302a, and 302b. When the sensing position-based pulses 322a, 322b are respectively the same as one of the absolute position-based pulses 300a, 300b, 302a, and 302b, the micro-controller unit 34 will identify the card 1 as authentic; alternatively, when one of the sensing position-based pulses 322a, 322b is different from each of the absolute position-based pulses 300a, 300b, 302a and 302b, the micro-controller unit 34 will identify the card 1 as fake. In this embodiment, the sensing position-based pulse 322a generated by the sensor 32c and associated with the sensing mark 12a is the same as the absolute position-based pulse 302a of the reference position-based pulse 300, and the sensing position-based pulse 322b generated by the sensor 32c and associated with the sensing mark 12b is the same as the absolute position-based pulse 302b of the reference position-based pulse 300, so the micro-controller unit 34 identifies the card 1 as authentic.

According to the aforesaid description, no matter the card is inserted into the housing (not shown) equipped with the card discriminating system 3 in which direction, the card discriminating system 3 can always sense the position-based pulse of the sensing marks 10a, 10b, 12a, or 12b by the sensors 32a, 32b or 32c, so as to identify whether the card is authentic or not.

In the aforesaid second embodiment, the card discriminating system 3 may further comprise a display module 36 for displaying the information regarding whether the card 1 is authentic or not. The card discriminating system 3 may further comprise a power supply (not shown) for providing power for the position-based pulse generating module 30, the sensors 32a, 32b, 32c, the micro-controller unit 34, and the display module 36.

Figure 8:
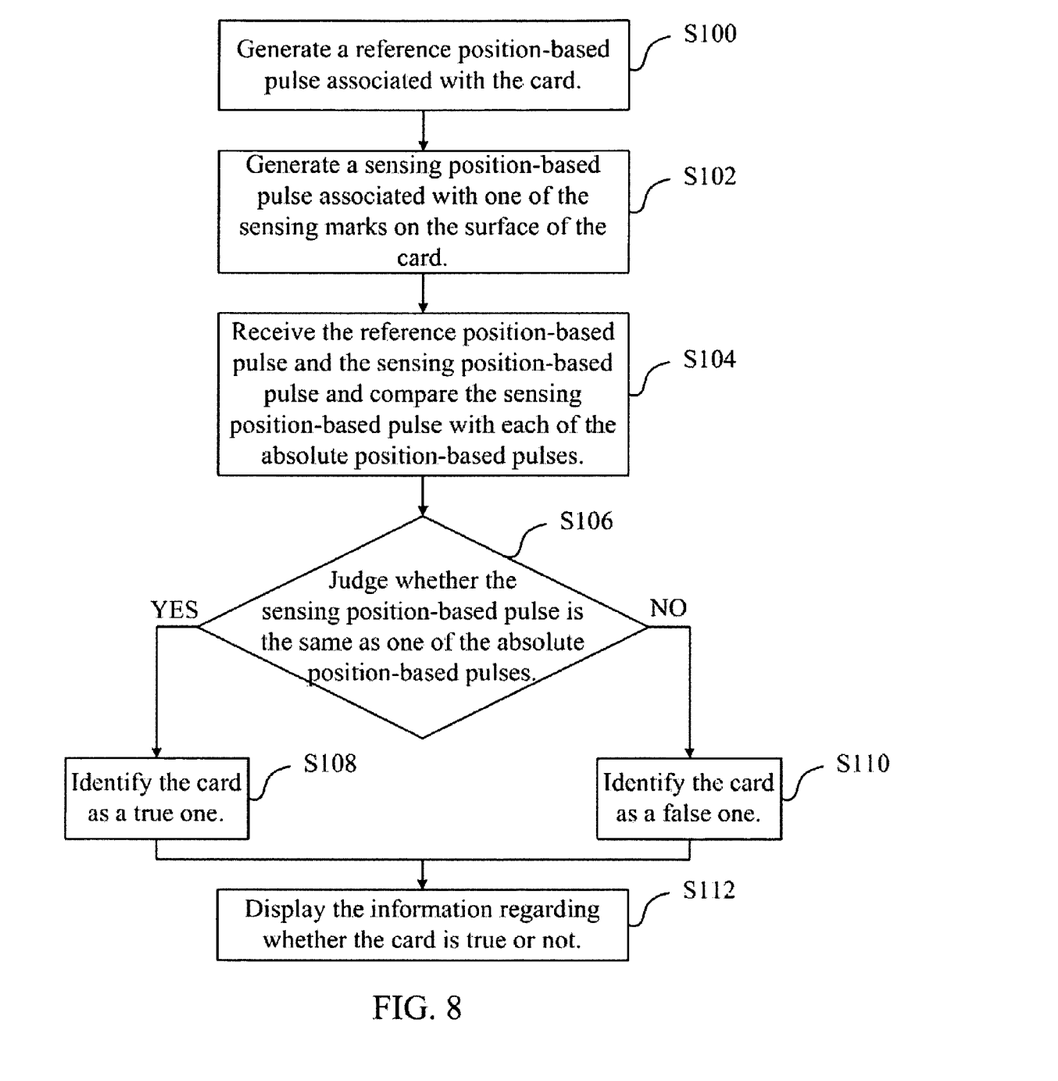
FIG. 8 is a flowchart showing the card discriminating method according to a preferred embodiment of the invention.

Referring to FIG. 8, FIG. 8 is a flowchart showing the card discriminating method according to a preferred embodiment of the invention. The method of the invention is used for identifying the authenticity of a card. The card has a surface (e.g. obverse side or reverse side), and N sensing marks are formed on the surface of the card. According to the aforesaid first embodiment, the method of the invention comprises the following steps. At the start, step S100 is performed to generate a reference position-based pulse associated with the card, wherein the reference position-based pulse comprises N absolute position-based pulses, each of which corresponds to one of the N sensing marks respectively. Afterwards, step S102 is performed to generate a corresponding sensing position-based pulse according to one of the N sensing marks on the surface of the card. Step S104 is then performed to receive the reference position-based pulse and the sensing position-based pulse and to compare the sensing position-based pulse with each of the N absolute position-based pulses. Step S106 is then performed to judge whether the sensing position-based pulse is the same as one of the N absolute position-based pulses. If it is YES, go to step S108; otherwise, go to step S110. Step 108 is performed to identify the card as authentic, and then go to step S112. Step S110 is performed to identify the card as fake, and then go to step S112. Finally, step S112 is performed to display the information regarding whether the card is authentic or not.

Compared to the prior art, the card discriminating system and the method thereof of the invention utilizes at least one sensor to sense the position-based pulse of the corresponding sensing mark on the card. Furthermore, according to the number of the sensing marks on the card and the position of each sensing mark, the invention may employ a plurality of sensors, each of which corresponds to one of the sensing marks on the card. Accordingly, no matter the card is inserted in which direction, the card discriminating system can always sense at least one position-based pulse of the sensing marks, so as to identify whether the card is authentic or not.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A card discriminating system for identifying whether a card is authentic or not, the card having a surface, N sensing marks being formed on the surface of the card, N being a natural number, the system comprising:

a position-based pulse generating module for generating a reference position-based pulse while the card actuates and passes through the position-based pulse generating module, the reference position-based pulse comprising N absolute position-based pulses, each of which corresponding to one of the N sensing marks respectively;

at least one sensor for generating a sensing position-based pulse while one of the N sensing marks on the surface of the card passes through the at least one sensor; and a micro-controller unit respectively coupled with the position-based pulse generating module and the at least one sensor, the micro-controller unit being used for receiving the reference position-based pulse and the sensing position-based pulse and for comparing the sensing position-based pulse with each of the N absolute position-based pulses, wherein when the sensing position-based pulse is the same as one of the N absolute position-based pulses, the micro-controller unit identifies the card as authentic, or when the sensing position-based pulse is different from each of the N absolute position-based pulses, the micro-controller unit identifies the card as fake.

2. The system of claim 1, wherein the surface of the card is an obverse side or a reverse side of the card.

3. The system of claim 1, further comprising a display module for displaying the information regarding whether the card is authentic or not.

4. The system of claim 3, further comprising a power supply for providing power for the position-based pulse generating module, the at least one sensor, the micro-controller unit, and the display module.

5. A card discriminating method for identifying whether a card is authentic or not, the card having a surface, N sensing marks being formed on the surface of the card, N being a natural number, the method comprising the steps of:

generating a reference position-based pulse associated with the card, the reference position-based pulse comprising N absolute position-based pulses, each of which corresponding to one of the N sensing marks respectively;

generating a sensing position-based pulse associated with one of the N sensing marks on the surface of the card;

receiving the reference position-based pulse and the sensing position-based pulse and comparing the sensing position-based pulse with each of the N absolute position-based pulses; and identifying the card as authentic when the sensing position-based pulse is the same as one of the N absolute position-based pulses, or identifying the card as fake when the sensing position-based pulse is different from each of the N absolute position-based pulses.

6. The method of claim 5, wherein the surface of the card is an obverse side or a reverse side of the card.

7. The method of claim 5, further comprising the step of: displaying the information regarding whether the card is authentic or not.

* * * * *